United States Patent [19]
Ye et al.

[11] Patent Number: 6,006,990
[45] Date of Patent: Dec. 28, 1999

[54] DATAFORM READER UTILIZING HAND JITTERING COMPENSATION METHOD

[75] Inventors: Angi Ye, Lynnwood; C. Jim Li, Bothell, both of Wash.

[73] Assignee: Telxon Corporation, Woodlands, Tex.

[21] Appl. No.: 08/788,178

[22] Filed: Jan. 24, 1997

Related U.S. Application Data

[63] Continuation-in-part of application No. 08/526,868, Sep. 12, 1995, Pat. No. 5,691,773.

[51] Int. Cl.$^6$ ...................................................... G06K 7/10
[52] U.S. Cl. ................... 235/454; 235/455; 235/462.01; 235/462.02; 235/462.26; 235/472.01
[58] Field of Search ..................................... 235/454, 455, 235/466, 472, 469, 470, 462.01, 462.02, 462.1, 462.14, 462.26, 472.01

[56] References Cited

U.S. PATENT DOCUMENTS

| | | | |
|---|---|---|---|
| 4,567,524 | 1/1986 | Levine . | |
| 4,724,307 | 2/1988 | Dutton et al. | 235/455 |
| 5,308,966 | 5/1994 | Danielson et al. | 235/472 |
| 5,324,923 | 6/1994 | Cymbalski et al. . | |
| 5,347,110 | 9/1994 | Audebert et al. . | |
| 5,389,918 | 2/1995 | Kusaka et al. . | |
| 5,444,231 | 8/1995 | Shellhammer et al. . | |
| 5,506,392 | 4/1996 | Barkan et al. . | |
| 5,691,773 | 11/1997 | Wang et al. | 235/494 |
| 5,702,059 | 12/1997 | Chu et al. | 235/462 |
| 5,703,349 | 12/1997 | Meyerson et al. | 235/472 |
| 5,714,745 | 2/1998 | Ju et al. | 235/469 |
| 5,717,195 | 2/1998 | Feng et al. | 235/470 |
| 5,736,725 | 4/1998 | Danielson | 235/462 |
| 5,736,726 | 4/1998 | Vanhorn et al. | 235/472 |
| 5,763,864 | 6/1998 | O'Hagan et al. | 235/472 |

OTHER PUBLICATIONS

Title: *Metanetics Corporation IR–2000 Hand Held Image Reader User's Guide*. To the best of Applicant's knowledge, this publication was published more than one year prior to the filing date of the above–named patent application.

*Primary Examiner*—Donald Hajec
*Assistant Examiner*—Daniel St.Cyr
*Attorney, Agent, or Firm*—Watts, Hoffmann, Fisher & Heinke Co.

[57] ABSTRACT

A imaging based dataform reader utilizes a method of compensating for image offset between consecutive image fields comprising an interlaced image frame. The method includes determination of a disparity vector corresponding to the direction and magnitude of the offset between portions of successive fields. The disparity vector is determined by trial matching feature recognition data for a template area of a second image field to feature recognition data for a reference area of a first image field. The second field feature recognition data is trial matched to first field data at a plurality of offsets typical of hand jittering. The offset position providing the best feature match between the first and second fields is used to derive a disparity vector. The disparity vector is then applied to provide enhanced decoding by use of first field image data and registration-corrected second field image data. Feature recognition is achieved by use of digital filter value sets which may be adapted for recognition of horizontal, vertical or curved feature transitions.

4 Claims, 9 Drawing Sheets

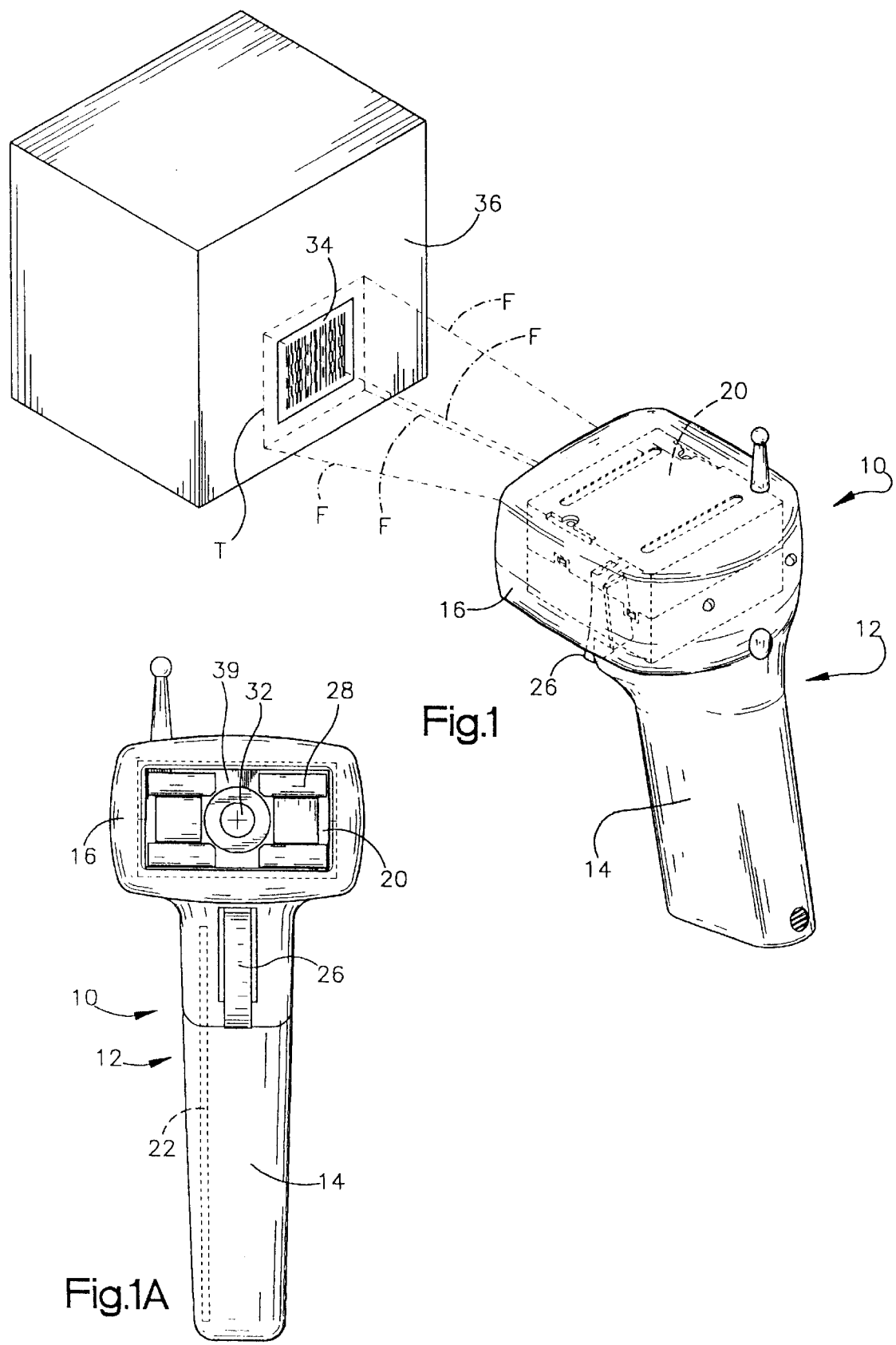

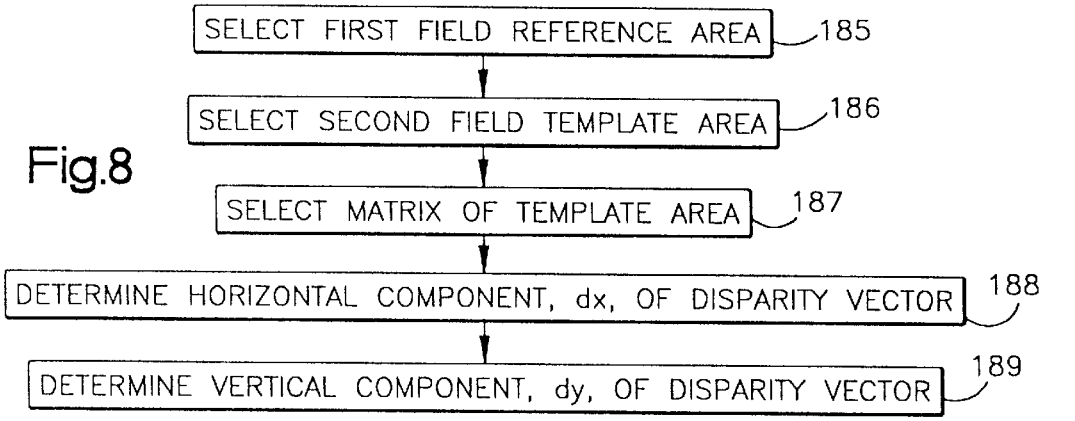
Fig.8
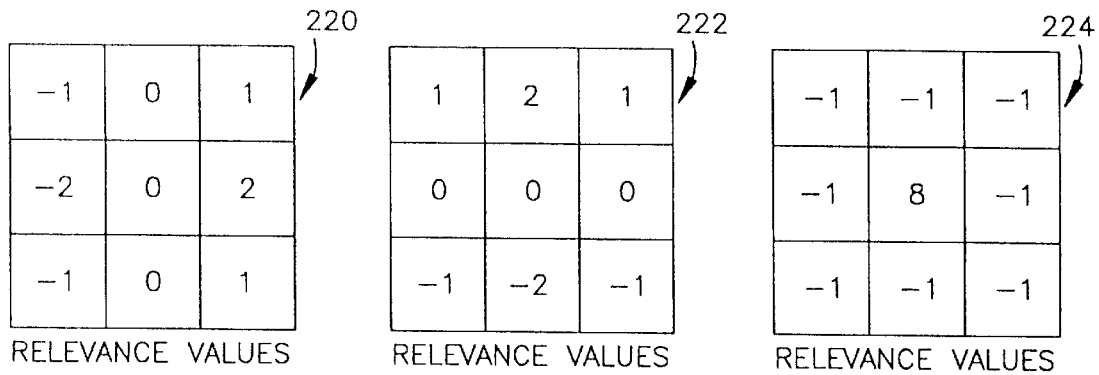
Fig.10A RELEVANCE VALUES
Fig.10B RELEVANCE VALUES
Fig.10C RELEVANCE VALUES
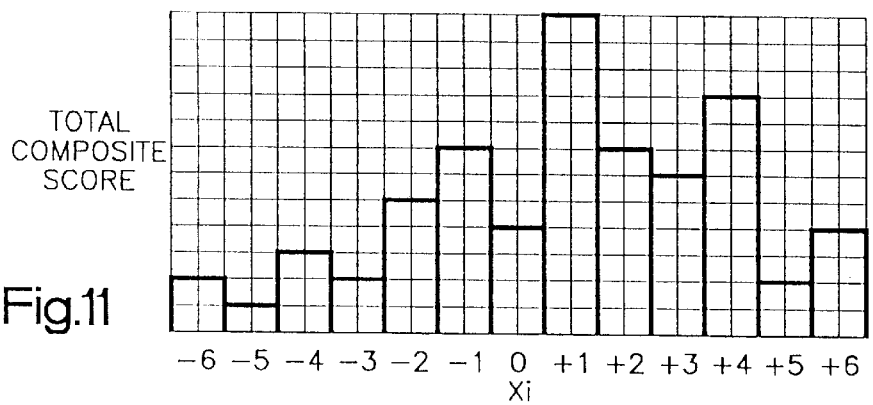
Fig.11
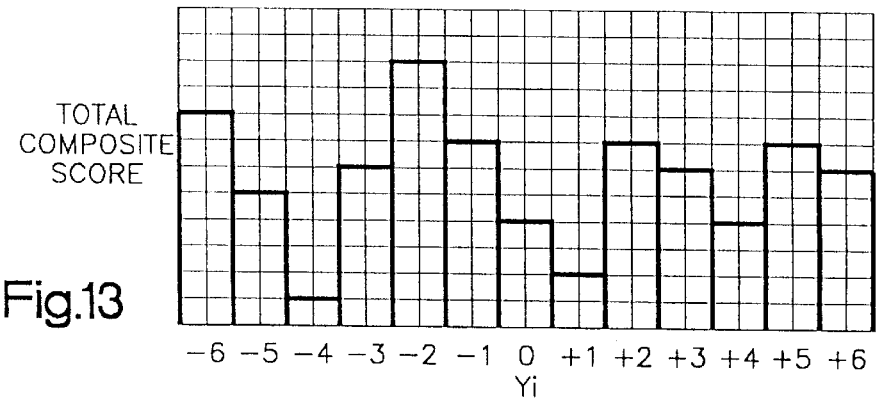
Fig.13

DATAFORM READER UTILIZING HAND JITTERING COMPENSATION METHOD

CROSS-REFERENCE TO RELATED APPLICATIONS

This application is a Continuation-in-part of U.S. application Ser. No. 08/526,868 filed Sep. 12, 1995 entitled ANTI-HAND-JITTERING DATAFORM READERS AND METHODS, now issued as U.S. Pat. No. 5,691,773 on Nov. 25, 1997.

This invention relates to an imaging based dataform reader and, more particularly, to a dataform reader utilizing a compensation method to compensate for lack of registration between successive image fields resulting from operator hand jittering during a dataform reading session.

BACKGROUND OF THE INVENTION

Portable data collection devices are widely used in manufacturing, service and package delivery industries to perform a variety of on-site data collection activities. Such portable data collection devices often include integrated dataform readers adapted to read bar code and/or matrix dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of alternating black or dark colored bars and white or light colored bars or spaces of varying widths. Both of these types of dataform readers are also capable of reading a "stacked" two dimensional (2D) bar code dataform such as PDF417, which has row indicator patterns utilized by the dataform reader for vertical synchronization.

A two dimensional (2D) charge coupled device (CCD) imaging based dataform reader has been proposed in U.S. application Ser. No. 08/544,618, filed Oct. 18, 1995 and entitled "Extended Working Range Dataform Reader Including Fuzzy Logic Image Control Circuitry". The 2D dataform reader disclosed in application Serial No. 08/544,618, which is assigned to the assignee of the present application and incorporated herein by reference, includes an imaging assembly having a two dimensional CCD array of photosensors. The imaging assembly is adapted to read 1D and 2D bar code dataforms (e.g., PDF417, Supercode, etc.) with and without vertical synchronization row indicator patterns as well as matrix dataforms (e.g., MaxiCode, Data Matrix, Code 1, etc.) which do not include vertical synchronization patterns. Photosensors or photodiodes of the photosensor array correspond to pixels constituting a captured image frame and the two terms will be interchangeably used throughout. Two dimensional and matrix dataforms are suitable for encoding greater quantities of data than 1D bar code dataforms.

The 2D dataform reader disclosed in application Ser. No. 08/544,618 utilizes an open loop feedback control system including fuzzy logic circuitry to determine proper exposure time and gain parameters for a camera assembly. The camera assembly includes an optic assembly for focusing reflected light from a target 1D, 2D or matrix dataform in a field of view of the optic assembly onto the 2D photosensor array. At the end of an exposure period, photosensor charges or voltage magnitudes are read out and converted to gray scale values. A magnitude of a photosensor's gray scale value is proportional to the intensity of reflected light incident on the photosensor over the exposure period, i.e., a photosensor receiving reflected light from a black portion of a target bar code dataform will have a lower voltage magnitude and a corresponding lower gray scale value than a photosensor receiving reflected light from a white portion of the target bar code dataform.

Cell extraction circuitry of the dataform reader analyzes the stored gray scale values associated with a captured image frame and generates binary cell values (0,1) for each pixel position. The result is a binary pattern which is representative of the pattern of dark and light bars of the original target dataform. Dataform reader decoding circuitry then decodes the cell extraction circuitry pattern of cell values to decode the encoded data in the target bar code dataform.

Two dimensional CCD imaging dataform readers operate to television or other interlaced video signal standards whereby image values for a single image frame are provided in the format of two successive interlaced fields of image values. Thus, for a single frame, a first field of the frame is generated by a readout of photosensor voltage magnitudes in every other horizontal line of photosensors in the 2D photosensor array (e.g., horizontal lines 1, 3, 5, 7, etc. of the photosensor array) at the end of a first exposure period. At the end of the next exposure period, a second field of the frame is generated by a readout of photosensor voltage magnitudes from photosensors in the remaining rows of photosensors (e.g., horizontal lines 2, 4, 6, 8 etc. of the photosensor array).

In a video image displayed for human viewing on a television screen, for example, movement of the image is expected and the human eye accommodates displacement of image portions from field to field and frame to frame. However, in imaging based dataform readers, movement or jittering of the dataform reader by an operator's hand during a dataform reading session will cause the location of the target dataform projected onto the 2D photosensor array to move. This is referred to as image displacement or offset between successive fields comprising an image frame. Such movement of the dataform image with respect to the photosensor array during a readout of successive fields will result in an inconsistency or lack of registration between the fields when the fields are interlaced to generate a representation of the captured frame. Such lack of registration may make it impossible for the decoding circuitry of the dataform to decode the pattern of binary cell values generated by the cell extraction circuitry from the gray scale values representing a captured frame stored in memory.

At present, dataform readers utilizing video-type imaging assembly configurations and 2D CCD photosensor arrays, cell extraction and decoding circuitry typically use only a single field to extract and decode an imaged dataform. The result is operation with only one-half of the resolution which the CCD imaging assembly is inherently capable of providing. Operation with half resolution obviously restricts operation to decoding of dataforms with less complexity and detail than could be decoded with full or frame-level resolution. Since the element density, that is, the number of black and white bars per unit area, of a 2D bar code dataform is much greater than the element density of a 1D bar code dataform, operation with half resolution is especially disadvantageous with respect to reading 2D bar code dataforms and matrix dataform, which also exhibit a high element density.

Objects of the present invention are, therefore, to provide a new and improved dataform reader having enhanced frame-level resolution while operating with image data subject to registration errors between image fields as a result of image displacement or offset between fields.

Other objects of the invention are to provide a dataform reader having improved decoding ability utilizing image data of a second image field to supplement decoding of a target dataform imaged in a first image field by one or more of:

(a) use of second field image data to decode portions of a dataform not satisfactorily decoded by use of the first field image data;

(b) decoding of both first and second fields of image data and using decoded portions of second field image data to supplement dataform portions not satisfactorily decoded by use of the first field image data;

(c) use of first and second field image data to determine the magnitude or direction, or both, of one or more disparity vectors representative of an image offset between data of the two fields, the disparity vector values being usable to correct offset errors during decoding of a dataform; and (d) use of disparity vector horizontal and vertical component values to enable combined use of image data of first and second fields, or actual combination of such image data into a registered frame of image data, for decoding a dataform.

SUMMARY OF THE INVENTION

A dataform reader utilizing a compensation method or algorithm to compensate for lack of resolution between successive image field due to operator hand jittering during a dataform reading session is disclosed. The dataform reader includes an imaging assembly for capturing an image in a field of view or target area of the assembly. The imaging assembly includes a camera assembly having a two dimensional (2D) array of photosensors or pixels and a control and decoder board. The control and decoder board includes a microprocessor and image processing circuitry for cell extraction and decoding of a captured image field or captured image frame.

The image processing circuitry operates under the control of the microprocessor. The microprocessor employs a compensation algorithm to enhance successful decoding by the image processing circuitry of a target dataform represented in captured image data. The control and decoder board also includes exposure parameter control circuitry for controlling the frame exposure period and the gain adjustment of the camera assembly.

The imaging assembly further includes an illumination assembly for illuminating a target dataform in the imaging assembly target area and an optic assembly for focusing reflected light from the target area upon the 2D array of photosensors of the photosensor array assembly.

In one operational embodiment of the dataform reader of the present invention, the microprocessor employs a method which utilizes, if necessary, a successive image field to aid in decoding one or more portions of a first image field that were undecodable.

In a second operational embodiment of the dataform reader of the present invention, the microprocessor employs a method or algorithm that provides for the determination of a disparity vector between two successive image fields which represents an offset between first and second fields of image data due to hand jittering. The disparity vector is used to correct for the image offset so that registration between the two fields is improved.

A method of determining values for a disparity vector, d, includes the following steps:

(a) select a reference area centered in a first image field;

(b) select a template area centered in a second image field, the template area being smaller than the reference area by X pixels in width and Y pixels in height; and (c) select a matrix area of template pixel positions within the template area;

d) determine the horizontal component, dx, of the disparity vector, d; and e) determine the vertical component, dy, of the disparity vector, d.

The disparity vector values dx and dy are utilized to shift the coordinates of the second field image data such that the second field image data is properly registered with respect to the first field image, that is, the image data of the resulting registered interlaced frame represents the true image received from the dataform reader target area. The image data corresponding to the interlaced frame is then subjected to cell extraction and decoding by cell extraction and decoding circuitry of the dataform reader.

The horizontal component, dx, of the disparity vector, d, is determined as follows:

a) determine feature values, $FV_m$, for each pixel position in the matrix area as follows:
1) utilize a horizontal transition sensitive digital filter and calculate a summed value, $SV_m$, for each pixel position in the matrix area;
2) determine upper and lower threshold values for the set of summed values, $SV_m$, such that 25% of the summed values are below the lower threshold, LT, and 25% of the summed values are above the upper threshold, UT;
3) assign feature values, $FV_m$, of negative one (1), zero (0) or positive one (+1) to each pixel position within the matrix area as follows—a feature value of −1 is assigned to pixel positions having a summed value SV<LT, a feature value of +1 is assigned to pixel positions having a summed value SV>UT and a feature value of 0 is assigned to all other pixel positions;

b) determine feature values, $FV_r$, for each pixel position in the reference area as follows:
1) utilize a horizontal transition sensitive digital filter and calculate a summed value, $SV_r$, for each pixel position in the reference area;
2) determine upper and lower threshold values for the set of summed values, $SV_r$, such that 25% of the summed values are below the lower threshold, LT, and 25% of the summed values are above the upper threshold, UT;
3) assign feature values, $FV_r$, to each pixel position within the reference area as follows—a feature value of −1 is assigned to pixel positions having a summed value SV<LT, a feature value of +1 is assigned to pixel positions having a summed value SV>UT and a feature value of 0 is assigned to all other pixel positions;

c) at each of the (X+1)×(Y+1) trial matching positions at which the template area can be trial matched to the reference area, calculate a composite score, CS, for the trial match by multiplying each pixel position feature value from the matrix area by the corresponding matched pixel position feature value of the reference area and summing the multiplied feature values;

d) for each horizontal trial matching position, $X_i$, calculate a total composite score, TCS, by summing the composite scores, CS, for the corresponding column of Y+1 trial matching positions;

e) the horizontal component, dx, of the disparity vector, d, is equal to the horizontal offset of the horizontal trial matching position having the highest positive total composite score, TCS.

The vertical component, dy, of the disparity vector, d, is determined as follows:

a) determine feature values, $FV_m$, for each pixel position in the matrix area as follows:
 1) utilize a vertical transition sensitive digital filter and calculate a summed value, $SV_m$, for each pixel position in the matrix area;
 2) determine upper and lower threshold values for the set of summed values, $SV_m$, such that 25% of the summed values are below the lower threshold, LT, and 25% of the summed values are above the upper threshold, UT;
 3) assign feature values, $FV_m$, of negative one (1), zero (0) or positive one (+1) to each pixel position within the matrix area as follows—a feature value of −1 is assigned to pixel positions having a summed value SV<LT, a feature value of +1 is assigned to pixel positions having a summed value SV>UT and a feature value of 0 is assigned to all other pixel positions;

b) determine feature values, $FV_r$, for each pixel position in the reference area as follows:
 1) utilize a vertical transition sensitive digital filter and calculate a summed value, $SV_r$, for each pixel position in the reference area;
 2) determine upper and lower threshold values for the set of summed values, $SV_r$, such that 25% of the summed values are below the lower threshold, LT, and 25% of the summed values are above the upper threshold, UT;
 3) assign feature values, $FV_r$, of negative one (1), zero (0) or positive one (+1) to each pixel position within the reference area as follows—a feature value of −1 is assigned to pixel positions having a summed value SV<LT, a feature value of +1 is assigned to pixel positions having a summed value SV>UT and a feature value of 0 is assigned to all other pixel positions;

c) at each of the (X+1)×(Y+1) trial matching positions at which the template area can be trial matched to the reference area, calculate a composite score, CS, for the trial match by multiplying each pixel position feature value from the matrix area by the corresponding matched pixel position feature value of the reference area and summing the multiplied feature values;

d) for each vertical trial matching position, $Y_j$, calculate a total composite score, TCS, by summing the composite scores, CS, for the corresponding row of X+1 trial matching positions;

e) the vertical component, dy, of the disparity vector, d, is equal to the vertical offset of the vertical trial matching position having the highest positive total composite score, TCS.

As noted above, the disparity vector is used by the microprocessor to adjust the second image field with respect to the first image field so that the resulting interlaced frame has proper registration between the fields.

For a better understanding of the invention, together with other and further objects, reference is made to the accompanying drawings and the scope of the invention will be pointed out in the accompanying claims.

BRIEF DESCRIPTION OF THE DRAWINGS

FIG. 1 is a perspective view of a dataform reader of the present invention is;

FIG. 1A is a front elevation view of the dataform reader of FIG. 1;

FIG. 8 is a flow chart setting forth a method of determining a horizontal disparity vector in accordance with the present invention;

FIG. 10A provides a set of relevance or weighing values for a digital filter used for recognition of horizontal transitions associated with an image feature;

FIG. 10B provides a set of relevance or weighing values for a digital filter used for recognition of a vertical transitions associated with an image feature;

FIG. 10C illustrates a set of relevance values for a digital filter used for recognition of curved transitions associated with an image feature;

FIG. 11 is a graphic representation of total composite scores as a function of horizontal trial matching positions, indicating relative degree of first and second field image matching at different horizontal offsets;

FIG. 13 is a graphic representation of total composite scores as a function of vertical trial matching positions,

DETAILED DESCRIPTION OF THE INVENTION

Figure 1B:
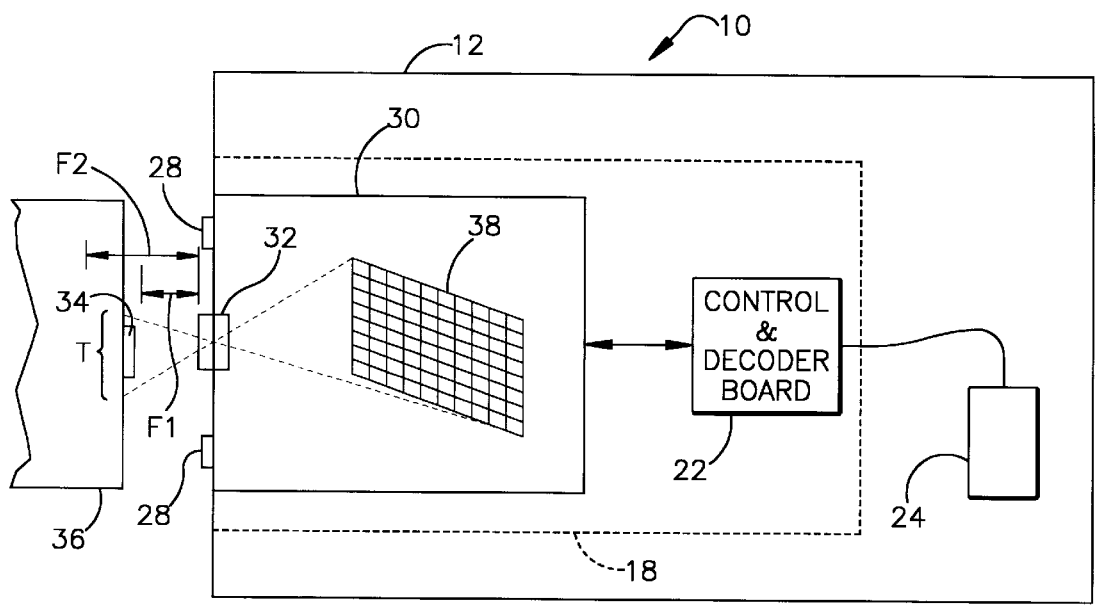
FIG. 1B is a schematic representation of the dataform reader of FIG. 1.

A dataform reader of the present invention is shown generally at 10 in FIGS. 1, 1A, 1B and 1C. The dataform reader 10 includes a housing 12 defining an interior region. The housing 12 includes a gripping portion 14 sized to be grasped in a hand of an operator and an angled snout 16 extending from the gripping portion. The snout 16 includes an opening through which a portion of a two dimensional (2D) charge coupled device imaging assembly 18 (shown schematically in FIGS. 1B and 1C) extends. The imaging assembly 18 includes a modular portion 20 (shown in FIG. 1A and in dashed line in FIG. 1) and a control and decoder board 22 electrically coupled to electronic circuitry in the modular portion. The control and decoder board 22 is supported within the gripping portion 14 of the housing 12.

Also supported within the housing gripping portion 14 is a power source 24 (FIGS. 1B and 1C) such as a rechargeable battery for supplying operating power to the dataform reader 10. A dataform reading trigger switch or actuator 26 extends through an opening in the gripping portion 14 and is depressed by an index finger of an operator to initiate a dataform reading session.

Figure 1C:
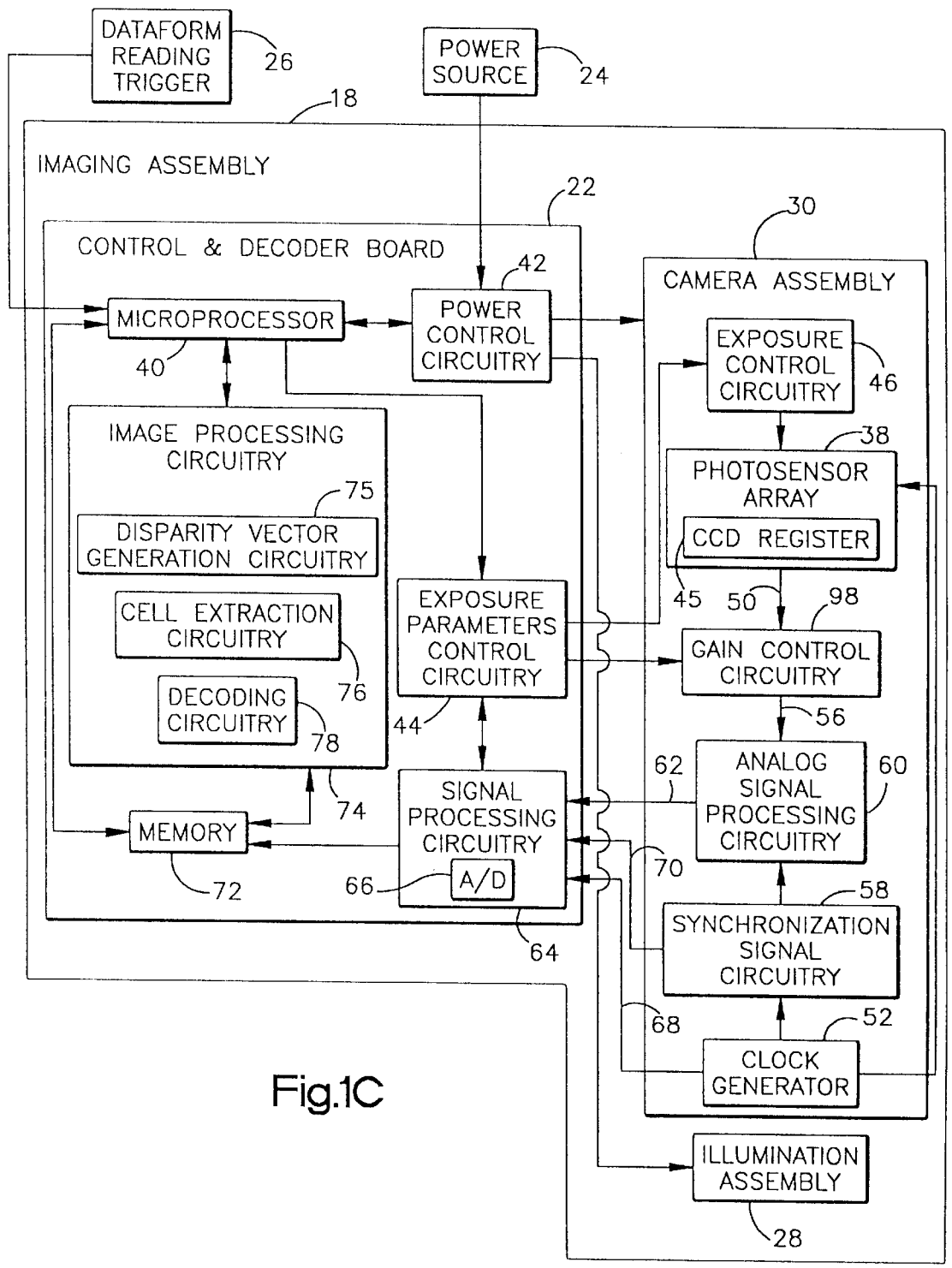
FIG 1C is schematic block diagram of selected circuitry of the dataform reader of FIG. 1.

The modular portion 20 of the imaging assembly 18 includes a housing which supports an illumination assembly 28 (FIG. 1A) and a camera assembly 30 (FIGS. 1B and 1C). The camera assembly 30 includes an optic assembly 32 which focuses an image of a target two dimensional (2D) bar code dataform 34 affixed to an object 36 onto a 2D charge coupled device (CCD) photosensor array 38 positioned within the modular portion 20. The preferred photosensor array 38 comprises a PAL (phase alteration line system) interlaced matrix of photosensors or photodiodes, each of which represents an image pixel. The preferred array size is 752 rows by 582 columns of photosensors which corresponds to an image frame comprising an array of 752 rows by 582 columns of pixels.

For reflected light from the dataform 34 to be properly focused on the photosensor array 38, the target dataform 34 must be in a target area or effective field of view T (FIGS. 1 and 1B) of the optic assembly 32. The target area T is defined both by an angular field of view of the optic assembly and the focal distance of the optic assembly. The optic assembly angular field of view is represented by the dashed lines labeled F in FIG. 1. The target area T is also limited by a near field focal distance F1 (FIG. 1B) and a far field focal distance F2 of the optic assembly 32. An appropriate optic assembly is disclosed in U.S. application Ser. No. 08/623,963, filed Mar. 29, 1996, and entitled "Portable Data Collection Device With Viewing Assembly". application Ser. No. 08/623,963 is incorporated herein in its entirety by reference.

The photosensor array 38 receives reflected illumination from the target area T which is focused through the optic assembly 32. The illumination assembly 28 includes a plurality of surface mount light emitting diodes (LEDs) which generates a pattern of illumination substantially congruent with the optic assembly field of vision. Preferably, the illumination assembly 28 also includes a crosshair targeting illumination subassembly to aid in properly aiming the dataform reader 10 at the target dataform 34. Application Ser. No. 08/623,963, noted above, discloses a suitable illumination assembly with illumination and targeting LEDs appropriately focused through a lens array which forms a portion of an outwardly facing wall 39 (FIG. 1A) of the modular portion 22.

Turning to FIG. 1C, the control and decoder board 22 includes a microprocessor 40 which controls the operations of the dataform reader 10 including the imaging assembly 18. The power source 24 supplies power to power control circuitry 42 mounted on the control and decoder board 22. Exposure parameters control circuitry 44 mounted on the control and decoder board 22 generates control signals which are coupled to the camera assembly 30 to control the exposure period of image fields via exposure control circuitry 46 of the camera assembly. The exposure parameters control circuitry 44 also generates control signals coupled to gain control circuitry 48 of the camera assembly 30. The camera assembly 30 includes a clock generator 52 which provides clocking signals to the photosensor array 48 to read out photosensors (pixels) and generate an analog raw video signal 50. The analog raw video signal 50 is amplified and filtered by the gain control circuitry 48 of the camera assembly 30 resulting in a gain adjusted video signal 56.

Synchronization signals are generated by synchronization signal circuitry 58 to indicate which portions of the video signal 50 correspond to which photosensors or pixels of the photosensor array 38. The synchronization signals along with standard black level signals are incorporated into the gain adjusted video signal 56 by analog signal processing circuitry 60 generating a PAL composite analog video signal 62 which is output to signal processing circuitry 64 including an analog to digital (A/D) converter 66 mounted on the control and decoder board 22.

A read out of one set of photosensors of the photosensor array 38 generates a first field of analog image data representative of illumination incident or focused on the array by the optic assembly 32 during a first exposure period. A read out of a second set of photosensors of the photosensor array 38 generates a second field of analog image data representative of illumination focused on the array by the optic assembly 32 during a second exposure period. The two interlaced fields (i.e., two successive read outs of the photosensor array 38) comprise one full image frame of an image of the target area T. The camera assembly 30 generates consecutive fields of the image incident on the photosensor array 38, that is, the camera assembly 30 produces successive fields of an image of the target area T. An image field is generated by reading out charges (voltages) accumulated during an exposure period on a set of photosensors of the photosensor array 38.

A given image frame is comprised of a first image field and a second image field. The first image field is comprised of a read out of the photosensors in every other row of the photosensor array 38, e.g., the odd rows of photosensors of the array. The second image field is comprised of a read out of the photosensors in the other or remaining rows of the photosensor array 38, e.g., the even rows of photosensors of the array. For example, assume that there is a thirty millisecond interval between successive read outs or clock outs of a CCD register 67 electrically coupled to the photosensor array 38. Further, assume an exposure period of 10 milliseconds and assume that the odd rows of the photosensor array 38 will be read out first to generate a first image field, then the even rows of the photosensor array 38 will be read out next to generate a second image field. At time t=20 milliseconds, the photosensors in the odd rows will be grounded out. Then, the time t=20 milliseconds to t=30 milliseconds represents the exposure period of the photosensors of the odd rows. During the exposure period, charge will build up on the photosensors in proportion to the intensity of reflected light received by respective photosensors. At time t=30 milliseconds, the charges on each odd row photosensor will be read out to the CCD register 67, the read out charges comprise the first image field of the target area T.

At time t=50 milliseconds, the photosensors in the even rows will be grounded out. Then, the time t=50 milliseconds to t=60 milliseconds represents the exposure period of the photosensors of the even rows. At time t=60 milliseconds, the charges on each even row photosensor will be read out to the CCD register 45, the read out charges comprise the second image field of the target area T. Thus, an image frame comprising two successive fields is generated every 60 milliseconds.

Under the control of the microprocessor 40 mounted on the control and decoder board 22, the analog video signal 62 is input to the signal processing circuitry 64 along with clocking signals 68 from the camera assembly clock generator 52 and synchronization signals 70 from the camera assembly synchronization signal circuitry 58. The signal processing circuitry 64 includes synchronization extractor circuitry which receives the clocking signals 68 and the synchronization signals 70 and generates signals which are coupled to an analog to the A/D converter 66 causing the A/D converter to periodically digitize the composite analog video signal 62. The A/D converter 66 generates a series of 8 bit gray scale values, one gray scale value corresponding to each read out photosensor or pixel of the photosensor array 38. The periodicity of the A/D converter 66 is based on a non-continuous clock generated by the signal processing circuitry 64 and the gray scale values corresponding to a portion of the analog video signal 62 representing two fields or one frame is captured and stored in a memory 72.

A gray scale value for a photosensor or pixel is proportional to a voltage magnitude of the portion of the analog video signal 62 representative of that photosensor or pixel. The voltage magnitude associated with a photosensor or pixel, in turn, is proportional to an intensity of illumination incident on the photosensor during the photosensor's associated exposure period. Thus, gray scale value is a surrogate measure for intensity of illumination over the exposure period and the resulting charge stored on the photosensor. The signal processing circuitry 64 also generates address signals coupled to the memory 72 to indicate a storage location for each digital gray scale value generated by the A/D converter 66.

The gray scale values stored in the memory 72 are then subjected to cell extraction and decoding by image processing circuitry 74 operating under the control of the microprocessor 40. The image processing circuitry 74 includes disparity generation circuitry 75 which operates to generate a disparity vector and apply the vector to one image field of a pair of interlaced image fields comprising an image frame to improve registration between the image fields. The image processing circuitry 74 further includes cell extraction circuitry 76 which operates on the gray scale values to generate a pattern of binary values (0, 1). The binary pattern generated by the cell extraction circuitry corresponds to the target dataform 34, that is, the zeros of the binary pattern correspond to the dark areas of the target dataform 34 while the ones of the binary pattern correspond to the light areas of the target dataform. The pattern of cell extraction binary values corresponding to the target dataform 34 are decoded by decoding circuitry 78 of the image processing circuitry 74.

The cell extraction circuitry 76 may be programmed to utilize the cell extraction methods disclosed in U.S. patent application Ser. No. 543,122, filed on Oct. 13, 1995 and entitled "Sub Pixel Dataform Reader With Dynamic Noise Margins" or any other appropriate cell extraction methodology know to those skilled in the art. U.S. patent application Ser. No. 543,122 is incorporated herein by reference. Decoding of the binary pattern formed by the cell extraction circuitry 76 is accomplished by the decoding circuitry 78 which selects and utilizes a known decoding method suitable for the particular dataform format being decoded.

The microprocessor 40 will also employ one of the algorithms or methods discussed below to either: a) improve decoding ability where a single captured image field is used for decoding by utilizing a portion or portions of a second image field; or b) utilize the disparity vector generation circuitry to generate and apply disparity vector values to image field data to improve registration between two image fields by compensating for image offset between the fields thereby allowing decoding of the higher resolution interlaced image frame comprising the two image fields.

Hand jittering by the operator of the dataform reader 10 during a dataform reading session causes offset between successive fields resulting in lack of registration or alignment between the images of the respective fields. The offset occurs in the time gap between the termination or end of the respective exposure periods corresponding to the first and second image fields comprising a captured frame stored in the memory 72. The time gap between the exposure termination of the first and second sets of photosensors corresponding to the first and second image fields is typically on the order of about 0.02 seconds.

Figure 2A:
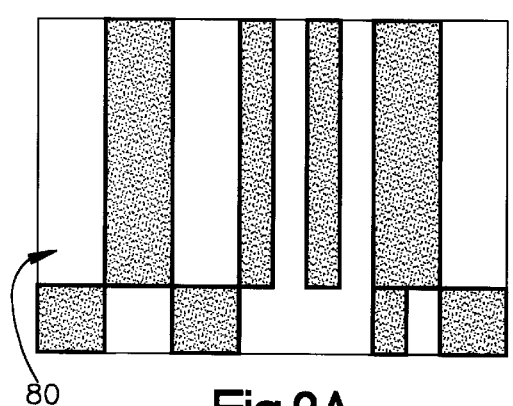
FIG. 2A is a representation of a portion of a target dataform projected onto a two dimensional (2D) photosensor array.

Referring now to FIGS. 2A–2D, certain effects of field-to-field image offset on registration accuracy in a frame of dataform image data are considered in further detail. FIG. 2A represents a portion 80 of the target bar code dataform 34 as projected on the photosensor array 38. A typical 2D bar code or matrix dataform may contain hundreds of individual cells or elements, i.e., dark bars or areas and white bars or areas. It should be understood that the imaged portion 80 represents only a portion of two rows of the target bar code dataform 34.

Figure 2C:
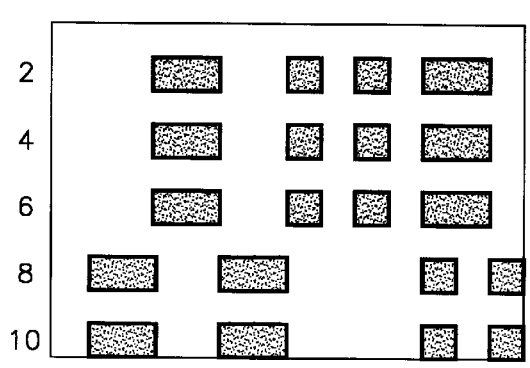
FIG. 2C is a representation of a second image field of the imaged target dataform of FIG. 2A, the second image field being offset upward and to the right as compared to the image field of FIG. 2B as a result of jitter of the dataform reader during image capture.
Figure 2B:
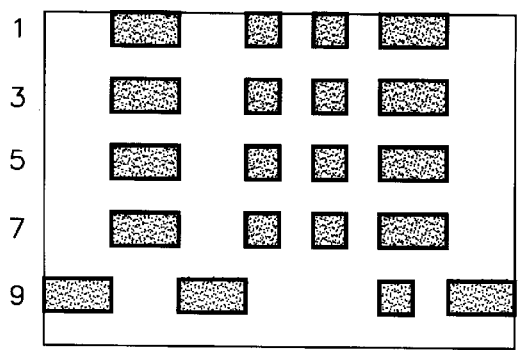
FIG. 2B is a representation of a first image field of the imaged target dataform of FIG. 2A.

FIG. 2B illustrates a representation of a first image field 82 corresponding to the bar code portion 80 of FIG. 2A after being processed by the signal processing circuitry 64. The first image field 82 is a pattern corresponding to a set of cell extraction binary values resulting from cell extraction of gray scale values generated from a read out of a set of odd-numbered rows (rows 1, 3, 5, 7, 9) of the photosensor array 38. Binary values having a value of zero correspond to portions of dark areas comprising the pattern of the image field 82 while binary values having a value of one correspond to portions of light areas comprising the pattern of the image field 82.

FIG. 2C illustrates a representation of a second image field 84 of the bar code portion 80 after being processed by the signal processing circuitry 64. The second image field 84 is a pattern corresponding to cell extraction binary values resulting from cell extraction of gray scale values generated from a read out of a set of even numbered rows (rows 2, 4, 6, 8, 10) of the photosensor array 38.

Figure 2D:
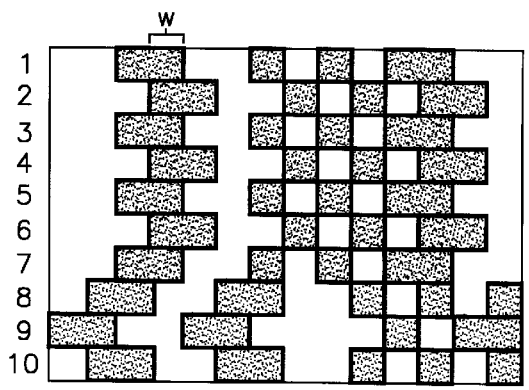
FIG. 2D represents an interlacing of the fields of FIGS. 2B and 2C to form an interlaced image frame exhibiting lack of registration.

FIG. 2D illustrates a representation an image frame 86 resulting from interlacing the patterns corresponding to the sets of binary values of the first and second image fields 82, 84. Movement of the dataform reader 10 during the interim time between the termination of the exposure period associated with the first field 82 and termination of the exposure period associated with the second field 84 has caused both a horizontal offset and a vertical offset between the first and second image fields 82, 84 such that the bars and spaces are no longer properly aligned either horizontally or vertically as in the target bar code dataform portion 80 shown in FIG. 2A. That is, there is lack of registration or misregistration between the first and second image fields. Misregistration with respect to the horizontal axis causes horizontal image resolution to be lost and, similarly, misregistration with respect to the vertical axis causes vertical image resolution to be lost.

As can be seen from a comparison of frame 86 of FIG. 2D and the dataform portion 80 of FIG. 2A, the movement of the dataform reader 10 during the interim time was in a horizontal direction equal to a width w (FIG. 2D) of one of the narrower dark bars of the target dataform 34 and in a vertical direction equal to one row of the photosensor array 38. For 2D dataforms with multiple rows of bar code patterns printed in a relatively small total area and for matrix dataforms which have complex, obliquely aligned patterns printed in a relatively small total area, the loss of vertical and/or horizontal resolution will severely negatively impact dataform decoding capability.

Method No. 1—Sequential Field Decoding

It should be appreciated that this method or algorithm as well as the ones following may be advantageously programmed in a suitable programming language, stored in the memory 72 (or other suitable memory) and executed by the microprocessor 40 during a dataform reading session. Other means of efficiently executing the described methods, of course, will be apparent to those skilled in the art. In accordance with a first method or algorithm for increasing dataform decoding ability of the imaging assembly 18, the microprocessor 40 and image processing circuitry 74 are programmed to attempt single field decoding of a captured image frame. Gray scale values associated with a first image field of the image frame are extracted from memory 72 by the microprocessor 40. The image processing circuitry 74 including the cell extraction circuitry 76 and the decoding circuitry 78 operate on the gray scale values in an attempt to decode the target dataform 34 imaged in the first image field. If decoding is successful, the decoding cycle is complete.

However, if one or more portions of the target bar code dataform 34 remain undecoded, use is made of a successive or second image field of the frame to supplement decoding. With incomplete decoding of the image of the target dataform 34, the undecodable portions of the imaged dataform will result in "gaps" in the decoded data from the total set of data represented in the target dataform 34. In this case, the microprocessor 40 accesses the gray scale values of the corresponding second image field comprising the captured frame. Again, the gray scale values associated with the second field are retrieved from memory 72 by the microprocessor 40 and the image processing circuitry 74 operates on the gray scale values in an attempt to decode the target dataform 34 imaged in the second field. If the undecodable portions of the imaged target dataform of the first field are successfully decoded in the imaged target dataform of the second field, the decoded data corresponding to these portions is used to "fill in the gaps" and generate a complete set of decoded data corresponding to the complete set of data represented in the target bar code dataform 34.

Figure 3:
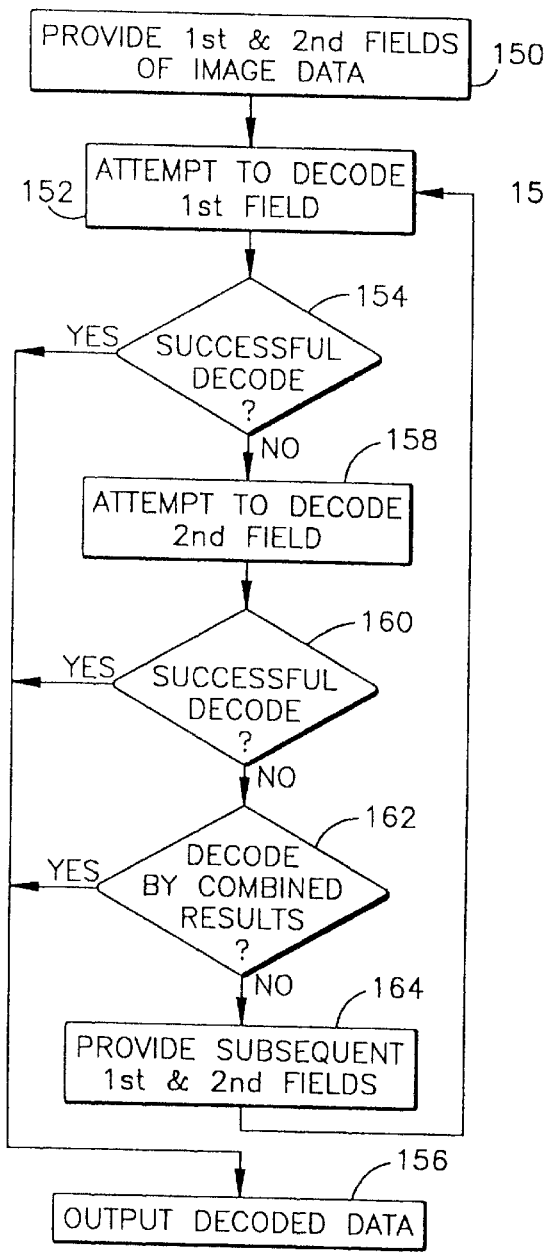
FIG. 3 is a flow chart setting forth a first method of decoding an imaged dataform using a second image field to supplement decoding of a first image field.

Referring now to FIG. 3, there is provided a flow chart describing the algorithm or method, shown generally at 100, in accordance with the present invention, for decoding the target dataform 34 by use of image data from sequential image fields subject to image offset causing registration error. At step 150, there are provided first and second fields comprising a captured image frame of the target area T. It will be assumed that the captured image frame includes an image of the target dataform 34. The "image values" or "image data" are the sets of gray scale values corresponding to the first and second image fields respectively. The gray scale values or image values corresponding to the first and second fields are stored in the memory 72. For each field, one gray scale value is stored for each photosensor of the photosensor array 38 read out to generate the field. A gray scale or image value is proportionate to illumination level incident on the photosensor during an exposure period. It will be appreciated that while the sequential fields are described as subject to image offset, the actual presence and magnitude of any such offset will depend on the particular operating conditions and the operator using the dataform reader 10.

At step 152, the image data of the first field is utilized by the image processing circuitry 74 to decode a portion of the imaged target dataform. Typically, an attempt will be made to decode the entire imaged dataform. Using known techniques, at step 154, microprocessor 40 determines whether the entire imaged dataform has been successfully decoded as necessary to provide a desired level of decoding. Assuming the entire imaged dataform is to be decoded (rather than a particular portion of interest) known types of error correction and similar techniques can be used to enable recovery of data encoded into the target dataform 34, even though initial decoding of the image data is not entirely successful. Successful decoding, therefore, need not require initial decoding of every cell or element of the imaged dataform. At step 154, if there has been a successful decode, the method proceeds to step 156 to output the decoded data for further processing, transmittal to a processing site, or other use. If, at step 154, a desired level of decoding, as predetermined for the particular circumstances of operation, has not been achieved the method proceeds to step 158.

At step 158, image data of the second field is utilized by the image processing circuitry 74 to decode a portion of the imaged dataform (as noted above, typically, an attempt is made to decode the entire imaged dataform). Step 160 is similar to step 154. If there has been a successful decode of the entire dataform at step 158, then at step 160 the method proceeds to step 156. If a desired level of decoding of the entire dataform is not achieved the method proceeds to step 162.

At step 162, the decoded data resulting from steps 152 and 158 are combined. The microprocessor 40 determines whether the results based on the separate decoding of the first and second fields when combined provide the desired level of decoding of the imaged dataform (e.g., a level of decoding which is adequate when augmented by error correction, etc.). If the combined results are adequate, then at step 162, the method proceeds to step 156. If a desired level of decoding has not been achieved, the method proceeds to step 164. At step 164, since the combined results of steps 152 and 158 were inadequate, the method repeats the foregoing steps to provide subsequent successive fields of image data for processing in conformity with the method set forth above.

With an understanding of the foregoing, many variations of the method in accordance with the present invention can be utilized by skilled persons. For example, at step 158, instead of attempting a complete decode of the imaged dataform, attention can be directed to attempting to decode at step 158 only one or more portions of the dataform which were not successfully decoded at step 152. More particularly, at step 158, data from each partially decoded portion of the dataform may be immediately combined with the decoded data resulting from step 152 to provide decoded data as quickly as possible. This is an "on the fly" embodiment. The method then proceeds basically as described and at step 162 a determination is made as to whether a desired level of decoding has been achieved based on the combined results. If not, the method would proceed to step 164 as described. As will be further described with reference to the decoding method set forth in FIG. 5, the decoding method of FIG. 3 may also be arranged to utilize disparity vector techniques for offset error correction in accordance with the present invention.

Method No. 2—Dataform Decoding Utilizing Two Fields and Disparity Vector

Portions of first and second image fields may advantageously be used to determine disparity vector values representative of the extent of an image offset between the two fields. The disparity vector generation circuitry 75 is employed by the microprocessor 40 to generate the disparity vector values. The disparity vector values are used to correct offset errors by "repositioning" the second image field with respect to the first by the magnitude of the disparity vector horizontal and vertical component values (dx, dy). Advantageously, the disparity vector horizontal and vertical component values (dx, dy) can be used to correct image offset effects to enable the image data from the two fields to be combined into a higher resolution frame of image data (having a resolution twice that of either field), which is then used for dataform decoding. Derivation of disparity vector values will be considered further in the following description.

With digital data for the first and second image fields available in the memory 72 and knowledge that the image data represents discrete dark and light dataform elements, portions of the stored image data can be analyzed to calculate a disparity vector value representative of the image offset between the fields. A correction can thereby be provided, by use of the disparity vector value, to enable the first and second fields of image data to be processed on an aligned basis so that the images represented by the first and second image fields are effectively registered (even though the images of the image fields are not registered based on actual pixel or photosensor locations of the photosensor array 38).

With availability of image data for the first and second fields as stored in memory 72, the microprocessor 40 utilizes the disparity vector generating circuitry 75 to determine a disparity vector value for one or more field locations using processing techniques based on fuzzy logic or other approaches.

For example, the methodology provided in U.S. Pat. No. 5,304,787, entitled "Locating 2-D Bar Codes" may be employed. The '787 patent describes techniques for locating a bounding box around a bar code in stored image data, for purposes of determining the location and orientation of the bar code in an image area. In accordance with the patent, the coordinates of the corners of a rectangular box encompassing a bar code can be identified. By identifying the coordinates of a corresponding corner of such a bounding box in each of two successive fields of image data, differences between such coordinates represent a magnitude and a direction of the relevant disparity vector.

As will be appreciated, for image data of a particular set of first and second image fields, the same disparity vector value will typically apply for all pixel locations. However, in particular situations, it may be desirable to provide a plurality of disparity vector computations for two successive image fields. In still other situations, it may be advantageous to provide a separate disparity vector calculation for processing each pixel of the photosensor array 38.

Figure 4:
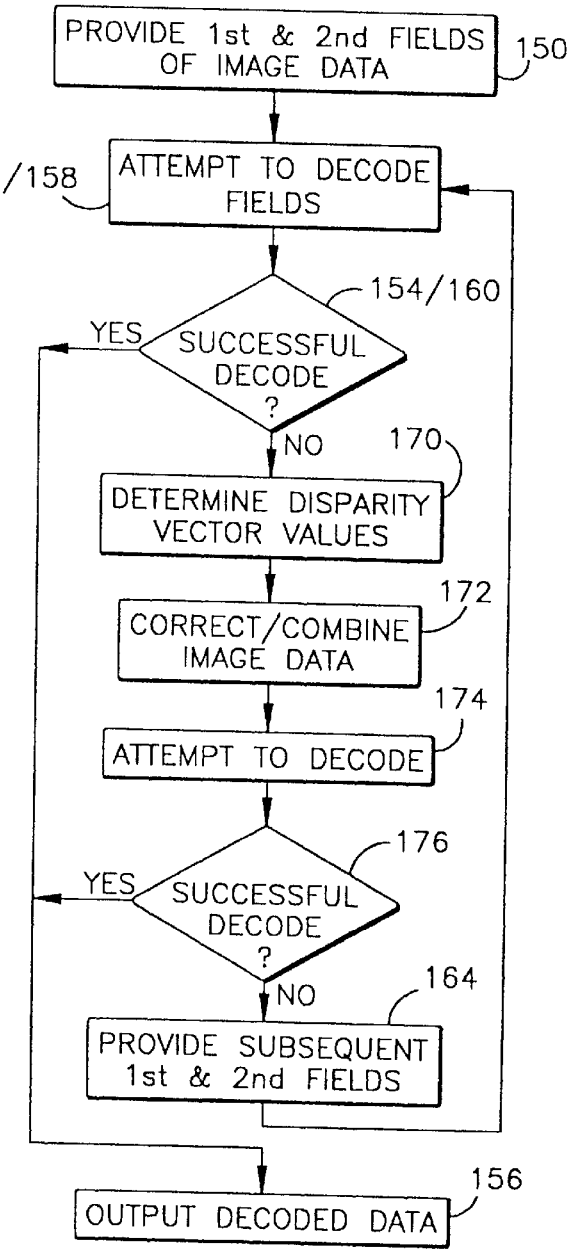
FIG. 4 is a flow chart setting forth a second method of decoding an imaged dataform utilizing first and second image fields and compensating for offset between the successive fields.

FIG. 4 is a flow chart illustrating a second dataform decoding method set forth generally at 110. At step 150, as in the first decoding method described in association with FIG. 3, first and second fields of image data are provided. Steps labeled 152/158 and 154/160 represent the series of steps 152, 154, 158, 160 set forth in the first decoding method 100 wherein attempts are made to decode the two fields independently. If successful, the second method proceeds to step 156, as was the case in the first method, if not, the second method proceeds to step 170. At step 170, image data of the first and second fields is used to determine disparity vector horizontal and vertical component values (e.g., the horizontally and vertically directed components that comprise the disparity vector) as described above by use of bounding boxes or other suitable techniques.

At step 172, the disparity vector is used to enable improved registration of image data of one field relative to image data of the other field. For example, disparity vector values can be used "on the fly" during the processing of image data to successively select and correct registration of pixel values for contiguous image elements of the first and second image fields. Alternatively, all image data for a portion or all of the second field can be corrected by use of the disparity vector values and stored in the memory 72 to provide image data for a complete frame with registration correction.

At step 174, the microprocessor 40 utilizes the image processing circuitry 74 to attempt to decode all or a selected portion of the imaged dataform using image data of both the first and second image fields. The combined image data, when corrected for offset, provides for improved registration and resolution and, therefore, has an increased probability of successful decoding by the image processing circuitry 74. As will be appreciated by skilled persons, steps 172 and 174 as described may be provided as separate steps or may effectively be aspects of a continuing correction/decoding process, depending on how the processing is implemented in particular applications.

At step 176, the microprocessor 40 determines whether a desired level of decoding has been achieved. If achieved, the second method proceeds to step 156, if not, the method proceeds to step 164 to provide subsequent fields of image data and repetition of the preceding steps. With an understanding of the first decoding method set forth above, it will be apparent that in particular applications, it may be appropriate to omit steps labeled 152/158 and 154/160. With this variation, the second decoding method would proceed directly from step 150 to step 170 for processing and decoding based on use of disparity vector values.

Method No. 3—Dataform Decoding Combining Decoding Methods Nos. 1 and 2

Figure 5:
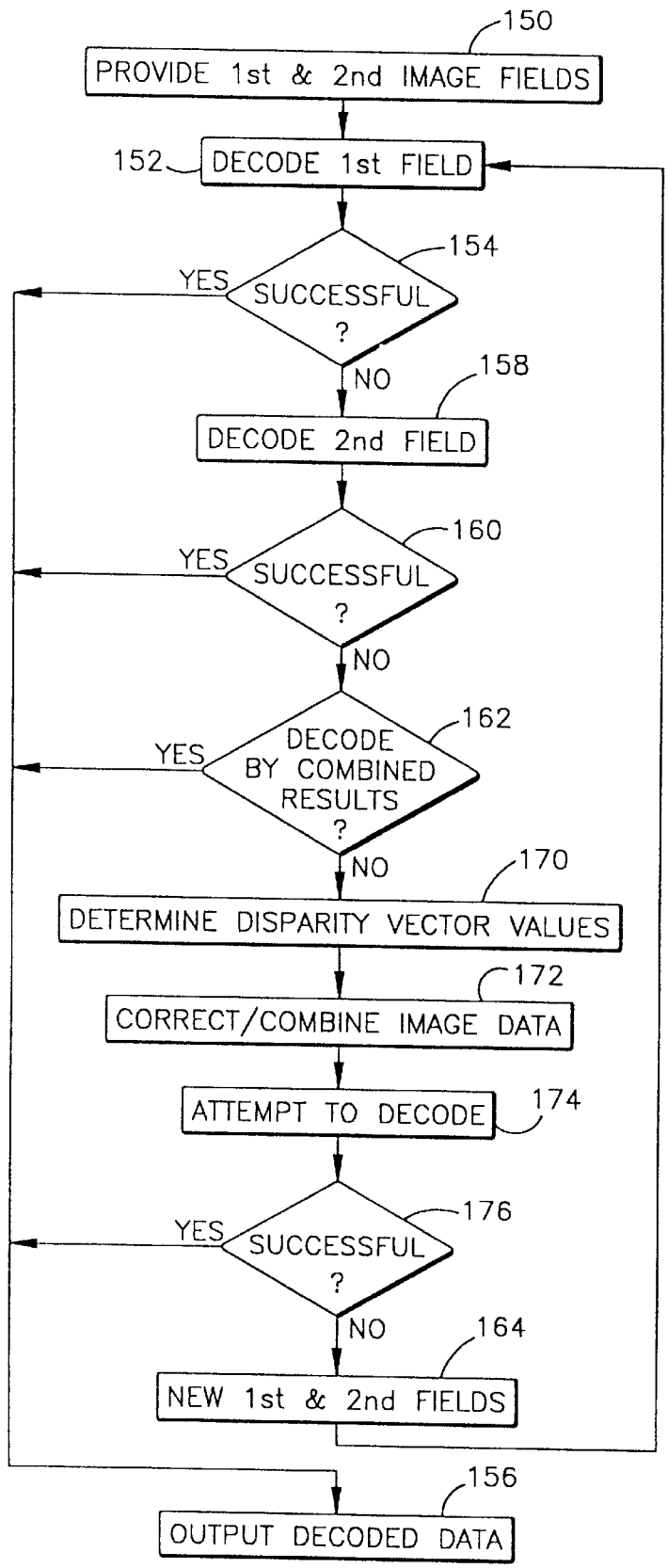
FIG. 5 is a flow chart setting forth a third method of decoding an imaged dataform utilizing the methods set forth in FIGS. 3 and 4.

FIG. 5 is a flow chart illustrating a third decoding method, shown generally at 120. The third decoding method combines aspects of the first and second decoding methods set forth in FIGS. 4 and 5 above. As shown, if steps 150, 152, 154, 158, 160 and 162 (as described with reference to FIG. 3) of the first decoding method do not provide the desired level of decoding, the third decoding method proceeds with steps 170, 172, 174, 176 of the second decoding method (as described with reference to FIG. 4). Choice and composition of steps of decoding methods in accordance with the present invention can thus be selected and formulated in view of the type and complexity of dataforms typical in particular applications, as well as the overall accuracy and completeness of decoded results required. Relevant operating conditions concerning operator performance and other physical aspects of operating performance can also be taken into consideration.

Determining Disparity Vector Values

Algorithms or methods of determining disparity vectors representative of offsets between successive fields of image data will be described with particular reference to FIGS. 6–12. As a practical matter, it has been found that in use of a hand-held dataform reader such as the dataform reader 10, successive field-to-field hand movement or jitter will typically represent an image shift on the order of 3 to 15 pixels in each of the horizontal (x) and vertical (y) directions. Thus, for the dataform reader 10, involuntary hand movement between termination of an exposure period generating a first image field and termination of an exposure period generating a second image field of an interlaced captured image frame can be expected to cause an image offset within the stated range. Methods for comparing image features in the first field with image features in the second field to determine disparity vectors will be described in a particular embodiment using trial matching over a range of up to 12 pixels of image shift in each of the horizontal and vertical directions.

Figures 6A, 6B:
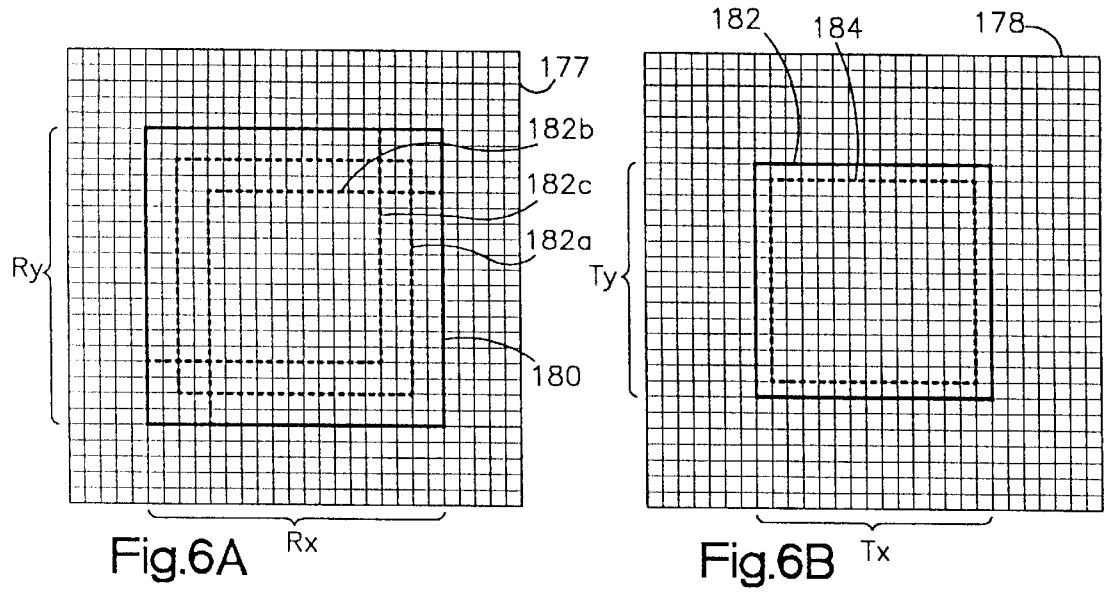
FIG. 6A is a representation of a 62×62 pixel area of the 2D photosensor array.
FIG. 6B is a representation of a 50×50 pixel area of the 2D photosensor array.

Pursuant to a method of determining a disparity vector for an offset between first and second fields of image data, FIG. 6A schematically represents a first image field 177. A reference area 180 which is Rx pixels wide by Ry pixels wide has been selected within the first field 177. In this example, reference area 180 (solid line) is 62 pixels by 62 pixels and is centered in the first field 177. (Note that the FIG. 6A is not drawn to scale since the image field 177 comprises 376 (752/2) rows by 582 columns of pixels.) With reference to FIG. 6B there is schematically illustrated second image field 178 including a selected template area 182. As shown, the template area 182 is a 50 by 50 pixel area centered in the second field 178. If the dimensions of the template area 182 are identified as Tx pixels wide by Ty pixels wide, it will be seen that the relationship of dimensions between the template and reference areas is Tx=Rx−X and Ty=Rx−Y, where, in this example, X=12 pixels and Y=12 pixels.

It will be appreciated that in the absence of hand jittering there would be no offset and the location of image features (that is, the position of the imaged dark and light cells or elements of the imaged dataform) in the template area 182 of the second image field 178 would exactly match the location of image features in the reference area 180 of the first field 177. This is illustrated by the position of a template area illustrated by a dashed box labeled 182a the first image field 177 in FIG. 6A which corresponds to the template area 182 in the second image field 178 in FIG. 6B. However, with random effects of hand jittering, the position of the second field 178 may be offset with respect to the first field 177. This condition is represented by template area 182b and template area 182c as drawn in FIG. 6A which show offset positions from the template area 182a superimposed on the first image field 177.

In this example, the template area 182b represented in dashed line in FIG. 6A represents a portion of the second image field 178 that has undergone a horizontal offset, $X_j$, equivalent to a horizontal or x value of positive six (+6) pixels, $X_j$=+6 pixels, and a vertical offset, $Y_j$, equivalent to a vertical or y value of negative six (−6) pixels, $Y_j$=−6 pixels. On the other hand, the template area represented in dashed position 182c has undergone a horizontal offset, $X_j$, equivalent to an x value of negative six (−6) pixels, $X_j$=−6 pixels, and a vertical offset, $Y_j$, equivalent to a y value of positive six (+6) pixels, $Y_j$=+6 pixels. It should be appreciated that other dimensions and relative horizontal and vertical size differentials can be selected between the reference and template areas. However, it will be seen that in this example, the X=12 pixel and Y=12 pixel horizontal and vertical size differentials enable offset matching over a range Rx=13 pixels in the x direction (e.g., $X_i$ can take on the values $X_i$=−6, −5, −4, −3, −2, −1, 0, +1, +2, +3, +4, +5, +6) and over a range Ry=13 pixels in the y direction (e.g., $Y_i$ can take on the values $Y_i$=−6, −5, −4, −3, −2, −1, 0, +1, +2, +3, +4, +5, +6). Such a range is adequate to address the majority of typical hand jittering offsets between first and second image fields, as experienced during operation of the dataform reader 10.

Figure 7:
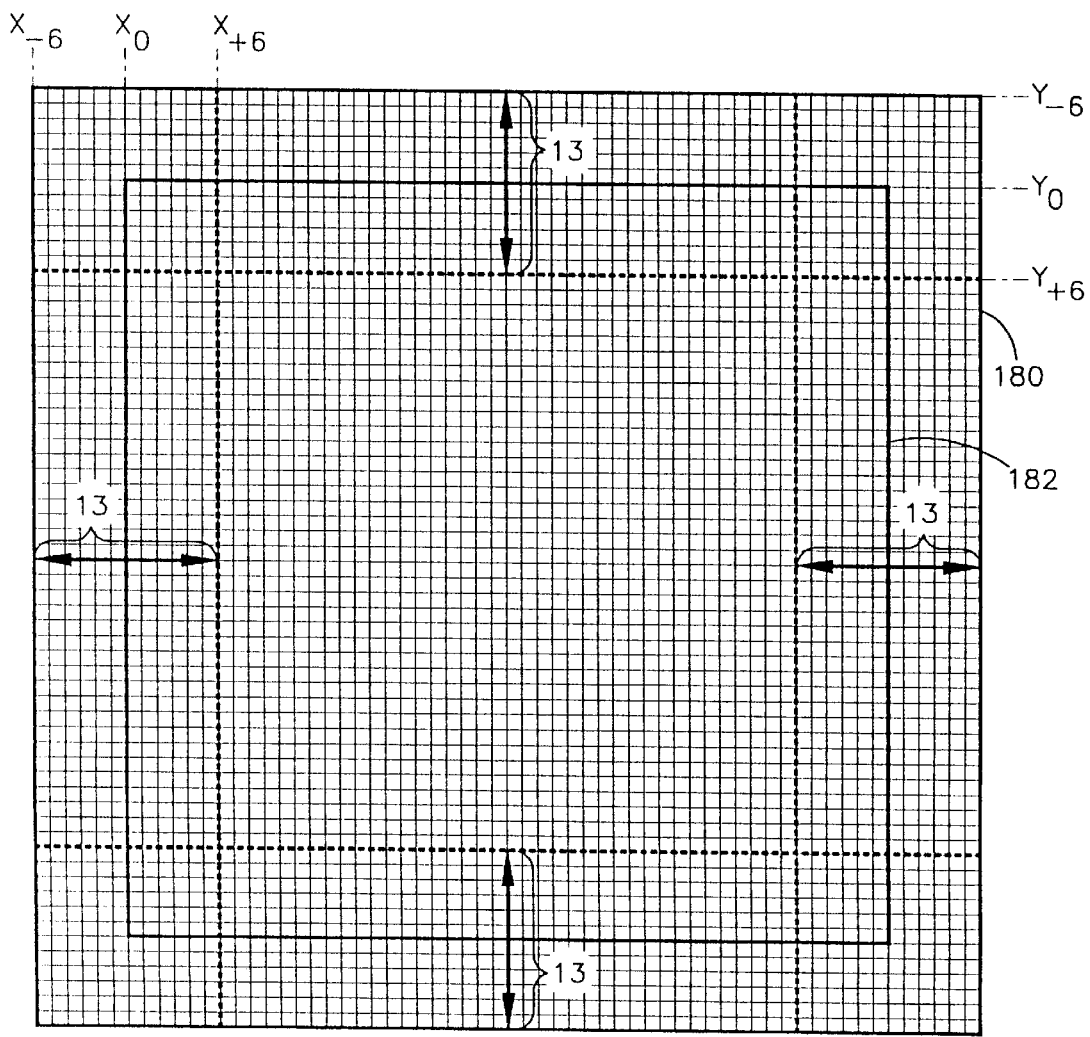
FIG. 7 illustrates test matching positions, representing horizontal and vertical offsets of up to 12 pixels each.

In this context, the X and Y pixel size differentials represent pixel position horizontal and vertical ranges over which the template area 182 could potentially be matched to the reference area 180 to achieve a match of image features in each field. The X=12 pixel and Y=12 pixel differentials thus provide a total of (X+1)*(Y+1)=Rx*Ry=13*13= 169 possible template area offset positions usable to find the best match to feature positions in the reference area. The number of possible template area offset positions will be defined as the number of trial match positions. Thus, No. of trial match positions=Rx*Ry=(X+1)*(Y+1) This is represented in FIG. 7 which schematically represents the ranges of thirteen offset positions available in the x and y directions of the template area 182 of the second field 178 with respect to the reference area 180 of the first field 177. In solid line the template area 182 is shown positioned at a central location with respect to the reference area 182. As can be seen along the right side of the reference area 180, template vertical offset positions, $Y_{-6}$, $Y_0$ and $Y_{+6}$ corresponding to a negative six pixel vertical offset, a zero pixel vertical offset (no vertical misalignment of the template and reference areas) and a positive six pixel vertical offset are marked. Along the top of the reference area 180, template horizontal offset positions, $X_{-6}$, $X_0$ and $X_{+6}$ corresponding to a negative six pixel horizontal offset, a zero pixel horizontal offset (no horizontal misalignment of the template and reference areas) and a positive six pixel horizontal offset are marked.

FIG. 8 sets forth a flow chart for a method of determining horizontal and vertical components (dx, dy) of a disparity vector (d). The method includes the following steps:

(a) select a reference area centered in a first image field (step labeled 185);

(b) select a template area centered in a second image field, the template area being smaller than the reference area by X pixels in width and Y pixels in height (step labeled 186);

(c) select a matrix area of template pixel positions within the template area (step labeled 187);

d) determine the horizontal component, dx, of the disparity vector, d (step labeled 188); and e) determine the vertical component, dy, of the disparity vector, d (step labeled 189).

For example, assume that the reference area 180 of the first field 177 comprises an area 62 pixels by 62 pixels centered in the first image field 177. Further, assume that the template area 182 comprises an area 50 pixels by 50 pixels centered in the second image field 178. Further assume, the selected matrix area 184 (shown in dashed line in FIG. 6B) of template positions consists of an area 48 pixels by 48 pixels centered in the template area 182. The 48×48 matrix area 184 corresponds to all pixel positions within the 50×50 template area 182 except for a single perimeter row of pixel positions extending around the outer edges of the template area 182.

Figure 9:
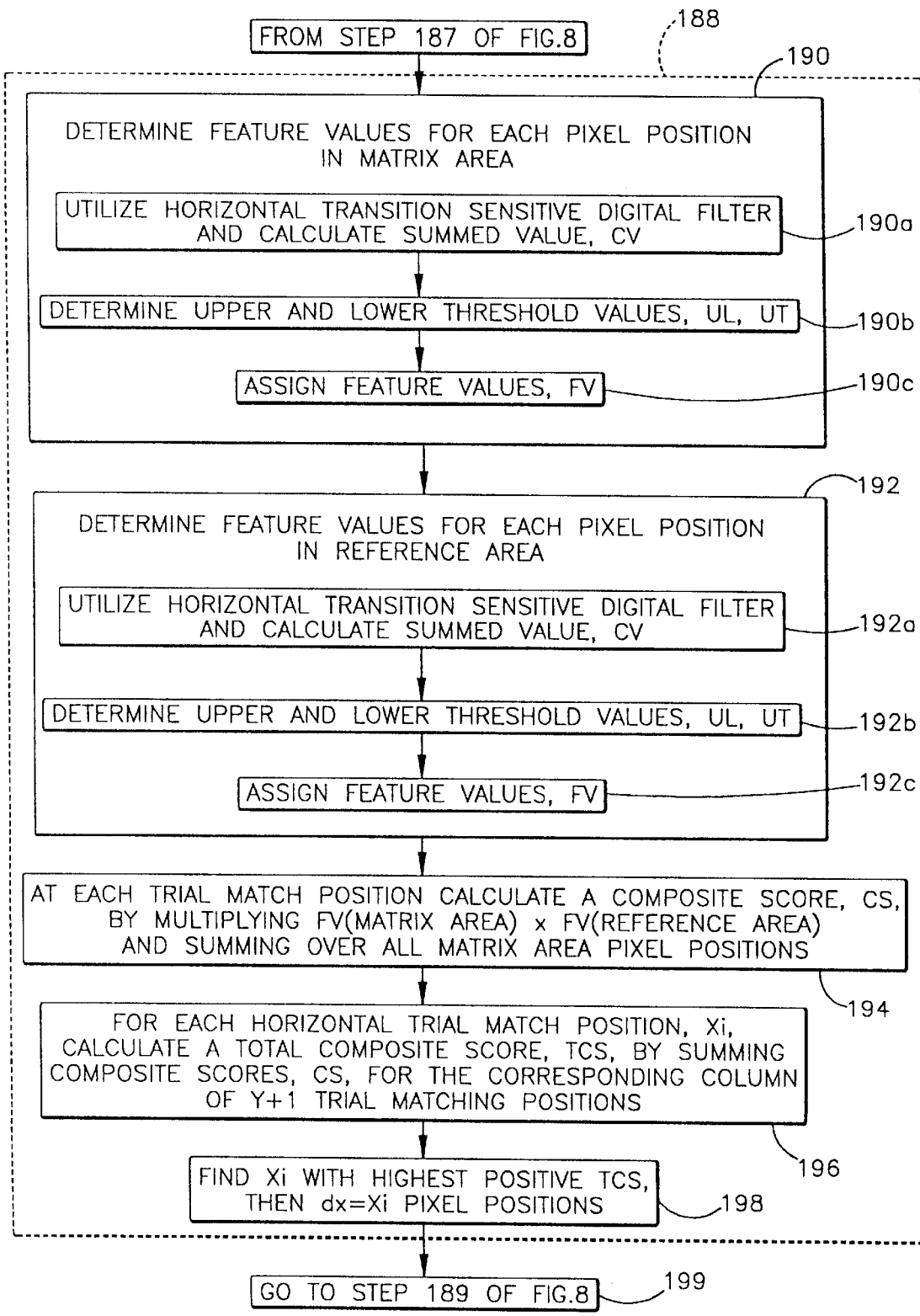
FIG. 9 is a flow chart setting forth detailed substeps corresponding to one of the steps of the flow chart of FIG. 8.

The method set forth in the flow chart of FIG. 8 at steps 188 and 189 require determination of the horizontal component, dx, and the vertical component, dy, of the disparity vector, d. FIG. 9 sets forth a flow chart for a method of determining the horizontal component, dx, while FIG. 12 sets forth a flow chart for a method of determining the vertical component, dy.

Referring to FIG. 9, determination of the horizontal component, dx, includes the following steps:

a) determine feature values, FV, (step labeled 190) for each pixel position in the matrix area 184 of template pixel positions as follows:
   1) utilize a horizontal transition sensitive digital filter and calculate a summed value, SV, for each pixel position in the matrix area 184 of template pixel positions (step labeled 190a);
   2) determine upper and lower threshold values for the set of summed values, SV, such that 25% of the summed values are below the lower threshold, LT, and 25% of the summed values are above the upper threshold, UT (step labeled 190b);
   3) assign feature values, FV, of negative one (1), zero (0) or positive one (+1) to each pixel position within the matrix area 184 of template pixel positions—a feature value of −1 is assigned to pixel positions having a summed value SV<LT, a feature value of +1 is assigned to pixel positions having a summed value SV>UT and a feature value of 0 is assigned to all other pixel positions (step labeled 190c);

b) determine feature values, FV, (step labeled 192) for each pixel position in the reference area 180 as follows:
   1) utilize a horizontal transition sensitive digital filter and calculate a summed value, SV, for each pixel position in the reference area (step labeled 192a);
   2) determine upper and lower threshold values for the set of summed values, SV, such that 25% of the summed values are below the lower threshold, LT, and 25% of the summed values are above the upper threshold, UT (step labeled 192b);
   3) assign feature values, FV, of negative one (1), zero (0) or positive one (+1) to each pixel position within the reference area—a feature value of −1 is assigned to pixel positions having a summed value SV<LT, a feature value of +1 is assigned to pixel positions having a summed value SV>UT and a feature value of 0 is assigned to all other pixel positions (step labeled 192c);

c) at each of the (X+1)×(Y+1) trial matching positions at which the template area can be trial matched to the reference area, calculate a composite score, CS, for the trial match by multiplying each feature value from the matrix of template pixel positions by the feature value of the corresponding matched pixel positions of the reference area and summing the multiplied feature values (step labeled 194);

d) for each horizontal trial matching position, $X_i$, calculate a total composite score, TCS, by summing the composite scores, CS, for the corresponding column of Y+1 trial matching positions (step labeled 196);

e) the horizontal component, dx, of the disparity vector, d, is equal to the horizontal offset of the horizontal trial matching position having the highest positive total composite score, TCS (step labeled 198).

Figure 12:
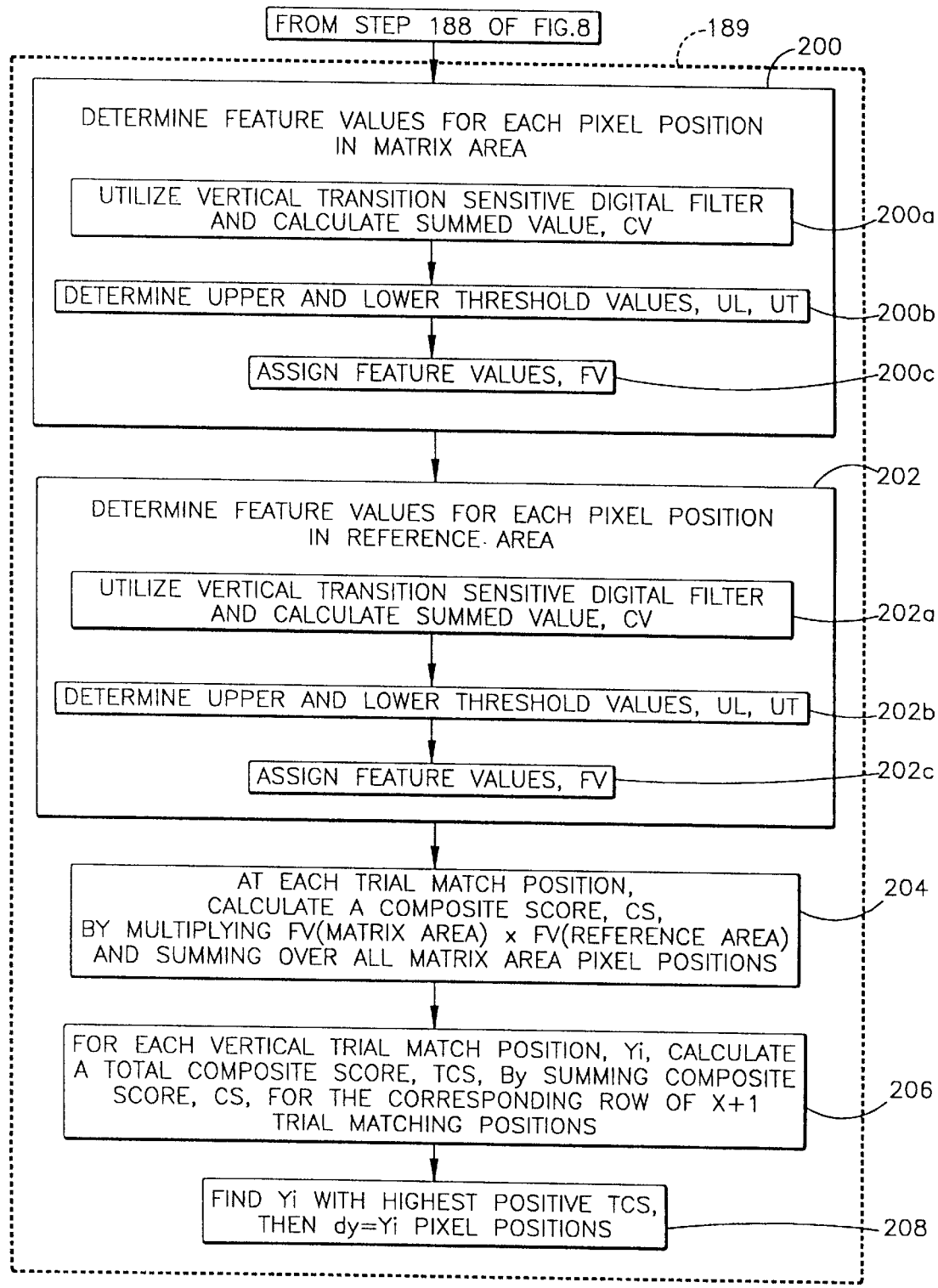
FIG. 12 is a flow chart describing a method of determining a vertical disparity vector corresponding to the horizontal disparity vector determined pursuant to the FIG. 8 flow chart.

After computing the horizontal component, dx, the method, at step 199, returns to step 189 of the method set forth in the FIG. 8 flow chart. Step 189 requires determination of the vertical component, dy. Referring to FIG. 12, determination of the horizontal component, dy, of the disparity vector, d, includes the following steps:

a) determine feature values, $FV_m$, (step labeled 200) for each pixel position in the matrix area 184 as follows:
   1) utilize a vertical transition sensitive digital filter and calculate a summed value, $SV_m$, for each pixel position in the matrix area 184 (step labeled 200a);
   2) determine upper and lower threshold values for the set of summed values, $SV_m$, such that 25% of the summed values are below the lower threshold, $LT_m$, and 25% of the summed values are above the upper threshold, $UT_m$ (step labeled 200b);
   3) assign feature values, $FV_m$, of negative one (1), zero (0) or positive one (+1) to each pixel position within the matrix area 184 as follows—a feature value of −1 is assigned to pixel positions having a summed value $SV_m<LT_m$, a feature value of +1 is assigned to pixel positions having a summed value $SV_m$>UTM and a feature value of 0 is assigned to all other pixel positions (step labeled 200c);

b) determine feature values, $FV_r$, (step labeled 202) for each pixel position in the reference area 180 as follows:
   1) utilize a vertical transition sensitive digital filter and calculate a summed value, $SV_r$, for each pixel position in the reference area (step labeled 202a);
   2) determine upper and lower threshold values for the set of summed values, $SV_r$, such that 25% of the summed values are below the lower threshold, $LT_r$, and 25% of the summed values are above the upper threshold, $UT_r$ (step labeled 202b);
   3) assign feature values, $FV_r$, of negative one (1), zero (0) or positive one (+1) to each pixel position within the reference area 180 as follows—a feature value of −1 is assigned to pixel positions having a summed value $SV_r<LT_r$, a feature value of +1 is assigned to pixel positions having a summed value $SV_r>UT_r$ and a feature value of 0 is assigned to all other pixel positions (step labeled 202c);

c) at each of the (X+1)×(Y+1) trial matching positions at which the template area 182 can be trial matched to the reference area 180, calculate a composite score, CS, for the trial match by multiplying each pixel position feature value, $FV_m$, from the matrix area 184 by the corresponding trial matched pixel position feature value, $FV_r$, of the reference area 180 and summing the multiplied feature values (step labeled 204);

d) for each horizontal trial matching position, $X_i$, calculate a total composite score, TCS, by summing the composite scores, CS, for the corresponding column of Y+1 trial matching positions (step labeled 206);

e) the vertical component, dy, of the disparity vector, d, is equal to the vertical offset of the vertical trial matching position having the highest positive total composite score, TCS (step labeled 208).

Step 190 of the FIG. 9 method of determining the horizontal component, dx, of the disparity vector, d, requires calculation of a feature value, $FV_m$, for each pixel position in the matrix area 184 of the second image field 178. To calculate a feature value $FV_m$ for a matrix area pixel position, at step 190a, a summed value, $CV_m$ must be calculated first. A digital filter is used to apply weighing or relevance values to the pixel's gray scale value and the gray scale values of that pixel's and the eight gray scale values of that pixel's surrounding or contiguous pixel positions. For example, to evaluate CV for a pixel position denoted $p_{i,j}$ the surrounding pixel positions would be:

| $p_{i-1,j+1}$ | $p_{i,j+1}$ | $p_{i+1,j+1}$ |
|---|---|---|
| $p_{i-1,j}$ | $p_{i,j}$ | $p_{i+1,j}$ |
| $p_{i-1,j-1}$ | $p_{i,j-1}$ | $p_{i+1,j-1}$ |

The gray scale values of each pixel noted above is multiplied by a corresponding relevance factor provided by a suitable digital filter. The relevance factors shown at 220 in FIG. 10A correspond to a Sobel type digital filter particularly suited to use in recognition of horizontal transitions or edges within an image area. Thus, the CV for pixel position $p_{i,j}$ would be calculated as follows: CV(pi,j)=(−1)× gray scale value of $p_{i-1,j+1}$
+(0)× gray scale value of $p_{i,j+1}$
+(1)× gray scale value of $p_{i+1,j+1}$
+(−2)× gray scale value of $p_{i-1,j}$
+(0)× gray scale value of $p_{i,j}$
+(2)× gray scale value of $p_{i+1,j}$
+(−1)× gray scale value of $p_{i-1,j-1}$
+(0)× gray scale value of $p_{i,j-1}$
+(1)× gray scale value of $p_{i+1,j-1}$ This process would be repeated to provide a summed value CV for each of the 48×48=2,304 pixel positions in the matrix area 184. At step 190b, a lower threshold LT and an upper threshold UT is determined based on a histogram of the summed values CV calculated in step 190a. The upper threshold UT is determined so that 25 percent of the 2,304 summed values CV are above the UT threshold. Similarly, the lower threshold LT is selected so that 25 percent of the 2,304 summed values CV are below the LT threshold. Then, at step 190c, feature values FV are assigned to each of the pixel positions as follows—if the CV value of a pixel position has a value greater than the upper threshold value, then the feature value FV assigned to the pixel position is positive one (+1), if the CV value of a pixel position has a value less than the lower threshold value, then the feature value FV assigned to the pixel position is negative one (−1), otherwise the feature value assigned to the pixel position is zero (0).

At step 192 of the method set forth in FIG. 9, feature values, $FV_r$, are is similarly determined for each pixel position of the 62×62 pixel position reference area 180 of the first image field 177. Again, it is typically advantageous to utilize the digital filter relevance values shown in FIG. 10A, which are particularly suited for recognition of horizontal transitions or edges.

As noted previously, the number of trial match positions is equal to 169. At step 194, for each trial match position, a composite score, CS, is calculated. The composite score is simply the summation of the products of the reference area and matrix area feature values ($FV_m \times FV_r$) for each of the matching pixel positions. There will be 2,304 such products since the number of matching pixel positions is limited by the 48×48 pixel size of the matrix area 184. Matching pixel positions means those pixel positions of the reference area 180 and matrix area 184 that are aligned for a given trial match position of the template area 182 of the second field 178 with respect to the reference area 180 of the first field 177.

At step 196, for each of the thirteen horizontal trial match positions $X_i$ (i.e., $X_{-6}, X_{-5}, X_{-4}, X_{-3}, X_{-2}, X_{-1}, X_0, X_1, X_2,$ $X_3, X_4, X_5, X_6$), a total composite score, TCS, is found. The TCS for a horizontal trial match position is determined by adding the composite scores CS for the corresponding thirteen vertical trial match positions. That is, as a result of step 194 there is an 13 row×13 column array of 169 composite scores as follows:

| CS(1, 1) | CS(2, 1) | CS(3, 1) | ... | CS(13, 1) |
|---|---|---|---|---|
| CS(1, 2) | CS(2, 2) | CS(3, 2) | ... | CS(13, 2) |
| ⋮ | | ... | | ⋮ |
| CS(1, 13) | CS(2, 13) | CS(3, 13) | ... | CS(13, 13) |

Adding the leftmost column of CS values, i.e., CS(1,1)+ CS(1,2)+ . . . +CS(1,13) would generate a TCS value for $X_6$. Similarly, the TCs of 12 columns in the array would be summed to generate TCS values for the remaining horizontal trial match positions, namely, $X_5, X_4, X_3, X_2, X_{-1}, X_0, X_1, X_2, X_3, X_4, X_5, X_6$. Finally, at step 198, the horizontal component, dx, of the disparity vector, d, would be set equal to the $X_i$ value having the highest positive TCS value. The $X_i$ represents the horizontal trial match position or offset compensation that gives the best registration between the image (gray scale) values of the matrix area 184 and the reference area 180. FIG. 11 illustrates a situation where $X_{+1}$ has the highest positive TCS. Thus, dx=+1 pixel position and the image data comprising the second image field 178 would be shifted one pixel position to the right before being combined with the image data comprising the first image field 177 to generate the data representing the interlaced frame. The data representing the interlaced frame would subsequently be subjected to cell extraction and decoding by the cell extraction and decoding circuitry of the imaging assembly.

Determination of the vertical component, dy, of the disparity vector, d, is similar to the determination of dx. A method is set forth in the flow chart of FIG. 12.

Step 200 of the FIG. 12 method of determining the vertical component, dy, of the disparity vector, d, requires calculation of a feature value, $FV_m$, for each pixel position in the matrix area 184 of the second image field 178. To calculate a feature value $FV_m$ for a matrix area pixel position, at step 200a, a summed value, $CV_m$, must be calculated first. A digital filter is used to apply weighing or relevance values to the pixel's gray scale value and the gray scale values of that pixel's and the eight gray scale values of that pixel's surrounding or contiguous pixel positions. For example, to evaluate CV for a pixel position denoted $p_{i,j}$ the surrounding pixel positions would be:

| $p_{i-1,j+1}$ | $p_{i,j+1}$ | $p_{i+1,j+1}$ |
|---|---|---|
| $p_{i-1,j}$ | $p_{i,j}$ | $p_{i+1,j}$ |
| $p_{i-1,j-1}$ | $p_{i,j-1}$ | $p_{i+1,j-1}$ |

The gray scale values of each pixel noted above is multiplied by a corresponding relevance factor provided by a suitable digital filter. The relevance factors shown at 222 in FIG. 10B correspond to a Sobel type digital filter particularly suited to use in recognition of vertical transitions or edges within an image area. Thus, the CV for pixel position $p_{i,j}$ would be calculated as follows: CV(pi,j)=(1)× gray scale value of $p_{i-1,j+1}$
+(2)× gray scale value of $p_{i,j+1}$
+(1)× gray scale value of $p_{i+1,j+1}$
+(0)× gray scale value of $p_{i-1,j}$ +(0)× gray scale value of $p_{i,j}$
+(0)× gray scale value of $p_{i+1,j}$
+(−1)× gray scale value of $p_{i−1,j−1}$
(−2)× gray scale value of $p_{i,j−1}$
+(−1)× gray scale value of $p_{i+1,j−1}$ This process would be repeated to provide a summed value, CV, for each of the 48×48=2,304 pixel positions in the matrix area 184. At step 200b, a lower threshold LT and an upper threshold UT is determined based on a histogram of the summed values CV calculated in step 200a. The upper threshold UT is determined so that 25 percent of the 2,304 summed values CV are above the UT threshold. Similarly, the lower threshold LT is selected so that 25 percent of the 2,304 summed values CV are below the LT threshold. Then, at step 200c, feature values, FV, are assigned to each of the pixel positions as follows—if the CV value of a pixel position has a value greater than the upper threshold value, then the feature value FV assigned to the pixel position is positive one (+1), if the CV value of a pixel position has a value less than the lower threshold value, then the feature value FV assigned to the pixel position is negative one (−1), otherwise the feature value assigned to the pixel position is zero (0).

At step 202 of the method set forth in FIG. 12, feature values, $FV_r$, are is similarly determined for each pixel position of the 62×62 pixel position reference area 180 of the first image field 177. Again, it is typically advantageous to utilize the digital filter relevance values shown in FIG. 10B, which are particularly suited for recognition of vertical transitions or edges.

As noted previously, the number of trial match positions is equal to 169. At step 204, for each trial match position, a composite score, CS, is calculated. The composite score is simply the summation of the products of the reference area and matrix area feature values ($FV_m \times FV_r$) for each of the matching pixel positions. There will be 2,304 such products since the number of matching pixel positions is limited by the 48×48 pixel size of the matrix area 184. Matching pixel positions means those pixel positions of the reference area 180 and matrix area 184 that are aligned for a given trial match position of the template area 182 of the second field 178 with respect to the reference area 180 of the first field 177.

At step 206, for each of the thirteen vertical trial match positions $Y_i$ (i.e., $Y_{−6}, Y_{−5}, Y_{−4}, Y_{−3}, Y_{−2}, Y_{−1}, Y_0, Y_1, Y_2, Y_3, Y_4, Y_5, Y_6$), a total composite score, TCS, is found. The TCS for a vertical trial match position is determined by adding the composite scores CS for the corresponding thirteen horizontal trial match positions. That is, as a result of step 204 there is an 13 row×13 column array of 169 composite scores as follows:

| CS(1, 1) | CS(2, 1) | CS(3, 1) | ... | CS(13, 1) |
|---|---|---|---|---|
| CS(1, 2) | CS(2, 2) | CS(3, 2) | ... | CS(13, 2) |
| ⋮ | | | ... | ⋮ |
| CS(1, 13) | CS(2, 13) | CS(3, 13) | ... | CS(13, 13) |

Adding the topmost column of CS values, i.e., CS(1,1)+CS(2,1) +. . . +CS(13,1) would generate a TCS value for $Y_{−6}$. Similarly, the TCs of 12 columns in the array would be summed to generate TCS values for the remaining vertical trial match positions, namely, $Y_{−5}, Y_{−4}, Y_{−3}, Y_{−2}, Y_{−1}, Y_0, Y_1, Y_2, Y_3, Y_4, Y_5, Y_6$. Finally, at step 208, the vertical component, dy, of the disparity vector, d, would be set equal to the $Y_i$ value having the highest positive TCS value. The $Y_i$ represents the vertical trial match position or offset compensation that gives the best registration between the image (gray scale) values of the matrix area 184 and the reference area 180. FIG. 13 illustrates a situation where $Y_{−2}$ has the highest positive TCS. Thus, dy=−2 pixel positions and the image data comprising the second image field 178 would be shifted two pixel positions to the right before being combined with the image data comprising the first image field 177 to generate the data representing the interlaced frame. The data representing the interlaced frame would subsequently be subjected to cell extraction and decoding by the cell extraction and decoding circuitry of the imaging assembly.

For recognizing curved transitions, a preferred digital filter relevance value set is as shown generally at 224 in FIG. 10C. The FIG. 10C relevance value set 224 represents a Laplace type digital filter configuration which can be used for feature recognition of image features characterized by curved transitions. A FIG. 10C type of digital filter can be used to determine both horizontal and vertical offsets in the manner discussed above.

With an understanding of the invention, skilled persons will be enabled to implement embodiments including a wide range of variations, modifications and compromise configurations. For example, with reference area 180 larger than template area 182 (to provide a total of (X+1)×(Y+1) trial matching positions, as discussed above) in some applications adequate performance may be achieved without implementing matching for all of the X×Y positions (some matching positions representing maximum diagonal offsets might be omitted).

In accordance with the present invention, disparity vectors can be derived to enable offset correction over a typical range of offsets caused by hand jittering. However, in practice, a particular operator may have a more steady hand. For increased speed and reduced processing in such a case, an adjustment may be provided to reduce the correctable offset. Thus, rather than 12 pixel vertical by 12 pixel horizontal offset matching, as described, a steady-handed operator might achieve good performance with offset matching reduced to a 6 pixel vertical by 6 pixel horizontal processing range, for example. It will also be apparent that in implementation of methods in accordance with the invention, individual steps need not be performed strictly in the order listed, but the order may be varied as appropriate in particular applications.

It should be appreciated, of course, that the disparity vector generating circuitry 75 may be embodied in hardware or in software stored in memory 72 and executed by the microprocessor 40 or in any other suitable manner know to those skilled in the art.

While there have been described the currently preferred embodiments of the invention, those skilled in the art will recognize that other and further modifications may be made without departing from the invention and it is intended to claim all modifications and variations as fall within the scope of the invention.

We claim:

1. An imaging based dataform reader for reading a target dataform and adapted to compensate for lack of resolution between successive interlaced fields of an image frame, the dataform reader comprising:

a) a housing defining an interior region; and
   b) an imaging assembly for imaging the target dataform including:
      i) a camera assembly supported by the housing including a two dimensional photosensor array comprising a plurality of rows including a first set of rows including every other row in the plurality of rows and a second set of rows including rows not included in the first set of rows, the first set of rows being read out at a time t1 to generate a first image field including a first representation of the target dataform and the second set of rows being read out at a time t2 to generate a second image field including a second representation of the target dataform, the first and second image fields comprising an interlaced image frame; and ii) a control and decoder board supported within the housing interior region and including:
  1) signal processing circuitry for converting the first image field into a first set of gray scale values and the second image field into a second set of gray scale values; and
  2) image processing circuitry including:
    A) disparity vector generation circuitry for comparing the first and second sets of gray scale values, generating a disparity vector, and applying the disparity vector to one of the first and second sets of gray scale values to generate a modified set of gray scale values having improved resolution with the other of the first and second sets of gray scale values and further combining the modified set of gray scale values and the other of the first and second sets of gray scale values to generate a combined set of gray scale values;
    B) cell extraction circuitry for processing the combined set of gray scale values and generating a set of binary values representative of light and dark areas of the target dataform; and
    C) decoding circuitry to decode the set of binary values.

2. The dataform reader of claim 1 wherein the disparity vector generated by the disparity generation circuitry includes a horizontal disparity vector value and a vertical disparity vector value, the horizontal disparity vector value representative of a horizontal offset in pixel position on the photosensor array between the first representation of the target dataform of the first image field and the second representation of the target dataform of the second image field and the vertical disparity vector value representative of a vertical offset in pixel position on the photosensor array between the first representation of the target dataform of the first image field and the second representation of the target dataform of the second image field.

3. The dataform reader of claim 2 wherein the disparity generation circuitry applies the horizontal disparity vector value and the vertical disparity vector value to the second set of gray scale values by shifting horizontal and vertical pixel positions of the gray scale values of the second set of gray scale values relative to pixel positions of the first set of gray scale values.

4. The dataform reader of claim 2 wherein the disparity generation circuitry applies the horizontal disparity vector value and the vertical disparity vector value to the first set of gray scale values by shifting horizontal and vertical pixel positions of the gray scale values of the first set of gray scale values relative to pixel positions of the second set of gray scale values.

* * * * *